United States Patent
Park et al.

(10) Patent No.: US 8,462,697 B2
(45) Date of Patent: Jun. 11, 2013

(54) SENSOR NODE HAVING SELF LOCALIZATION FUNCTION AND SELF LOCALIZATION METHOD THEREOF

(75) Inventors: Jong-jun Park, Daejeon-si (KR); Hoon Jeong, Daejeon-si (KR); Seong-soon Joo, Daejeon-si (KR); Jong-suk Chae, Daejoen-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 728 days.

(21) Appl. No.: 12/623,001

(22) Filed: Nov. 20, 2009

(65) Prior Publication Data

US 2010/0150070 A1 Jun. 17, 2010

(30) Foreign Application Priority Data

Dec. 16, 2008 (KR) .......................... 10-2008-0127965

(51) Int. Cl.
*H04W 4/00* (2009.01)
(52) U.S. Cl.
USPC .......................................... 370/328; 455/422.1
(58) Field of Classification Search
None
See application file for complete search history.

(56) References Cited

U.S. PATENT DOCUMENTS

| | | | | |
|---|---|---|---|---|
| 5,406,493 A | * | 4/1995 | Goto et al. | 701/462 |
| 5,803,411 A | * | 9/1998 | Ackerman et al. | 246/169 R |
| 5,983,156 A | * | 11/1999 | Andrews | 701/115 |
| 7,010,583 B1 | * | 3/2006 | Aizono et al. | 709/219 |
| 7,047,022 B2 | * | 5/2006 | Aoyama | 455/456.6 |
| 7,149,648 B1 | * | 12/2006 | Hreha | 702/152 |
| 7,835,333 B2 | * | 11/2010 | Park et al. | 370/338 |
| 7,855,684 B2 | * | 12/2010 | Ryu et al. | 342/464 |
| 7,920,512 B2 | * | 4/2011 | Maltseff et al. | 370/328 |
| 7,978,639 B2 | * | 7/2011 | Maltseff et al. | 370/312 |
| 2004/0087317 A1 | * | 5/2004 | Caci | 455/456.1 |
| 2006/0066472 A1 | * | 3/2006 | Janssen | 342/104 |
| 2007/0140163 A1 | * | 6/2007 | Meier et al. | 370/329 |
| 2007/0159986 A1 | | 7/2007 | Park et al. | |
| 2009/0076673 A1 | * | 3/2009 | Brabec | 701/23 |
| 2009/0147767 A1 | * | 6/2009 | Lee | 370/349 |
| 2009/0312037 A1 | * | 12/2009 | Jo et al. | 455/456.2 |
| 2010/0006642 A1 | * | 1/2010 | Boutcher et al. | 235/379 |

FOREIGN PATENT DOCUMENTS

| KR | 2001-0092141 | 10/2001 |
|---|---|---|
| KR | 10-2007-007440 | 7/2007 |
| KR | 10-2008-0076551 | 8/2008 |

\* cited by examiner

*Primary Examiner* — Bunjob Jaroenchonwanit
(74) *Attorney, Agent, or Firm* — Staas & Halsey LLP (57) ABSTRACT

Disclosed are a sensor node having a self localization function and a self localization method of the sensor node. The sensor node calculates a location thereof by receiving location information measured at each of two mobile nodes at different times and using four location information of the received location information. Additional cost and power consumption required for installing additional equipment such as an anchor node, a ultrasonic transceiver and a signal amplifier are reduced.

8 Claims, 6 Drawing Sheets

SENSOR NODE HAVING SELF LOCALIZATION FUNCTION AND SELF LOCALIZATION METHOD THEREOF

CROSS-REFERENCE TO RELATED APPLICATION

This application claims the benefit under 35 U.S.C. §119 (a) of Korean Patent Application No. 10-2008-0127965, filed on Dec. 16, 2008, the disclosure of which is incorporated by reference in its entirety for all purposes.

BACKGROUND

1. Field

The following description relates to a technology of locating a sensor node in a sensor network, and more particularly, to a sensor node having a self localization function and a self localization method thereof.

2. Description of the Related Art

In order to enhance the value of sensing data in most applications of sensor networks, it is very important to recognize a location of all sensor nodes. Conventional localization schemes of a sensor network are mainly divided into a ranging based localization and a ranging-free localization. The former is a performed by measuring a distance between an anchor node indicating a location through a received signal strength indicator (RSSI) or a time of arrival (ToA) and a sensor node and then performing a self localization by using locations of at least three anchor nodes and distances between the anchor nodes. The latter is performed by using an approximate distance difference and communication connectivity between an anchor node and a sensor node.

However, when a distance between the anchor node and a sensor node is measured using the RSSI, a great amount of distance error occurs, and thus localization error is increased. For this reason, in order to precisely measure a distance, additional equipment such as ultrasonic wave transceiver and an amplifier is necessary and high amounts of power are consumed.

In particular, if only a few anchor nodes are provided in the sensor network, the measuring of a distance between the anchor node and the sensor node requires a prediction of a multi-hop distance. As a result, the distance error is increased and thus localization error is increased. In addition, in a ranging-free localization, if the number of anchor nodes is small, localization error is increased.

However, when the initiation of a sensor network is performed, a large number of anchor nodes increases the number of GPS nodes, allowing increase in construction cost and power consumption. In addition, if a large number of anchor nodes are installed, location data needs to be manually inserted, and this thus increases the initiation cost of sensor networks. As a result, the installation cost of the sensor network is increased.

In the case of "U-city", an example of the application of sensor networks, a network is installed outdoors, in particular in a urban area, and thereby a large number of sensor nodes are disposed to detect weather, traffic, congestion area and serve as a driver assistant system. In order to realize such urban applications, a large amount of sensor nodes are required to be installed, so additional equipment needs to be mounted on the sensor node or a large number of anchor nodes needs to be disposed, creating an increase in the initiation cost of the sensor network.

Accordingly, in the case of the urban application using the sensor network, a method of locating a sensor node at low costs need to be developed by only using a small number of anchor nodes without having to mount additional equipment on the sensor node. In this regard, a study has been pursued to provide a sensor node capable of recognizing a location of the sensor node without using an anchor node.

SUMMARY

Accordingly, in one aspect, there is provided a sensor node having a self localization function capable of simply recognizing a location thereof by using location information measured at each of two mobile nodes at a time interval without using an anchor node, and a self localization method of the sensor node.

In one aspect, there is provided a sensor node having a self localization function, capable of calculating a location thereof by receiving location information measured at each of two mobile nodes at different times and using four location information included in the received location information.

Accordingly, all sensor nodes in a sensor network can recognize a location thereof by using location variation of two mobile nodes without using an anchor node, and thus reduces additional cost and power consumption required for installing additional equipment such as an anchor node, a ultrasonic transceiver and a signal amplifier.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

In the following description, a detailed description of known functions and configurations incorporated herein will be omitted when it may obscure the subject matter with unnecessary detail.

Before describing the exemplary embodiments, terms used throughout this specification are defined. These terms are defined in consideration of functions according to exemplary embodiments, and can be varied according to a purpose of a user or manager, or a relevant standard and so on. Therefore, definitions of the terms should be made on the basis of the overall context.

A sensor node is a fixed object installed in a sensor network and is used to sense data. For example, the sensor node may be provided as an outdoor camera device used to ascertain a speed of a vehicle.

A mobile node is a mobile object having a global location system (GPS) function. The mobile node calculates a location thereof and transmits the location to a sensor node such that the sensor node can calculate its own location using the location of the mobile node.

Figure 1:
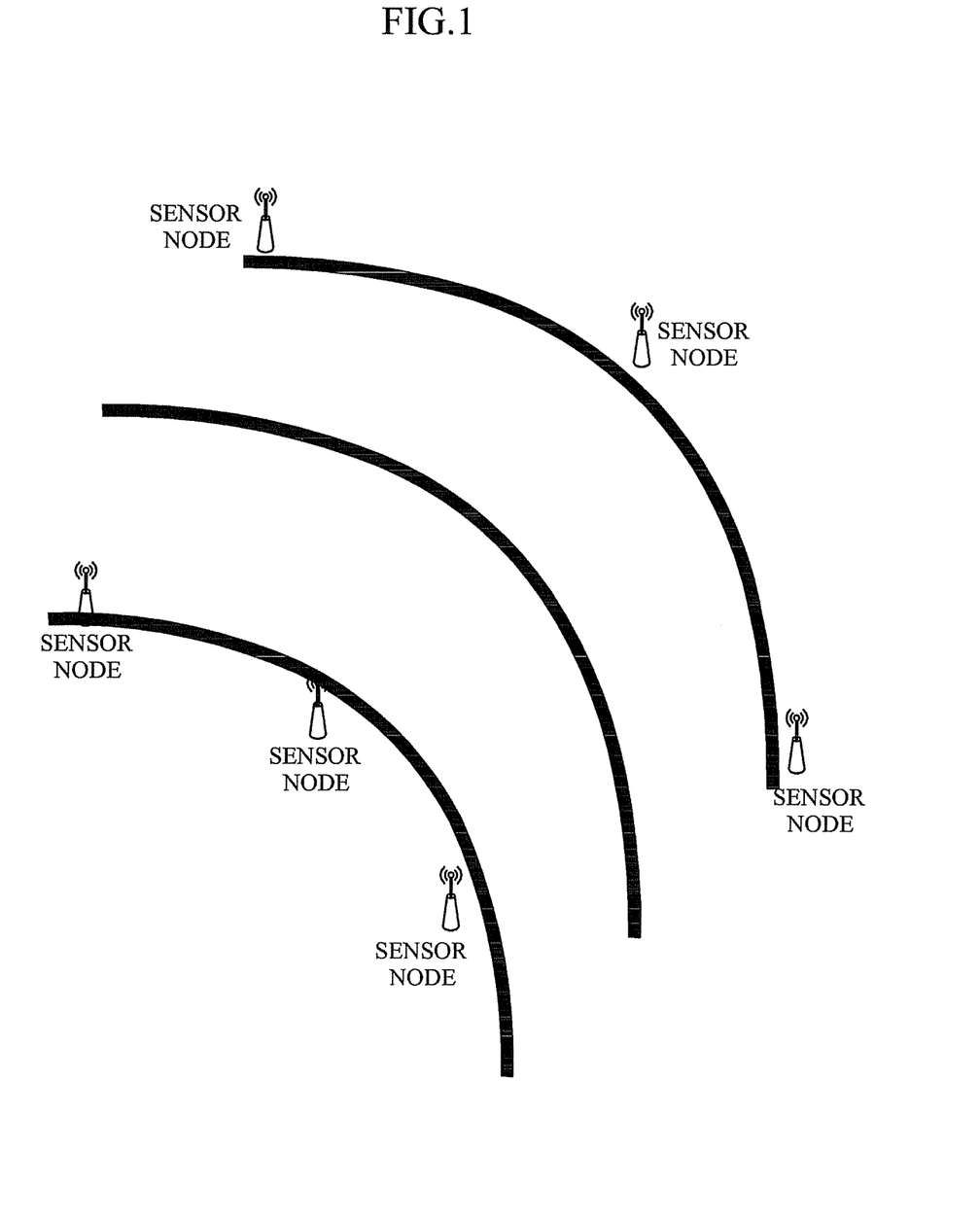
FIG. 1 is a view illustrating exemplary sensor nodes installed on a road.

FIG. 1 is a view illustrating exemplary sensor nodes installed on a road. As shown in FIG. 1, in a sensor network, a plurality of sensor nodes are installed at both sides of a road having at least two lanes and divided by a median strip at equal or non equal intervals. According to another embodiment, the sensor nodes may be installed along one side of one way road at equal or non-equal intervals.

Figure 2:
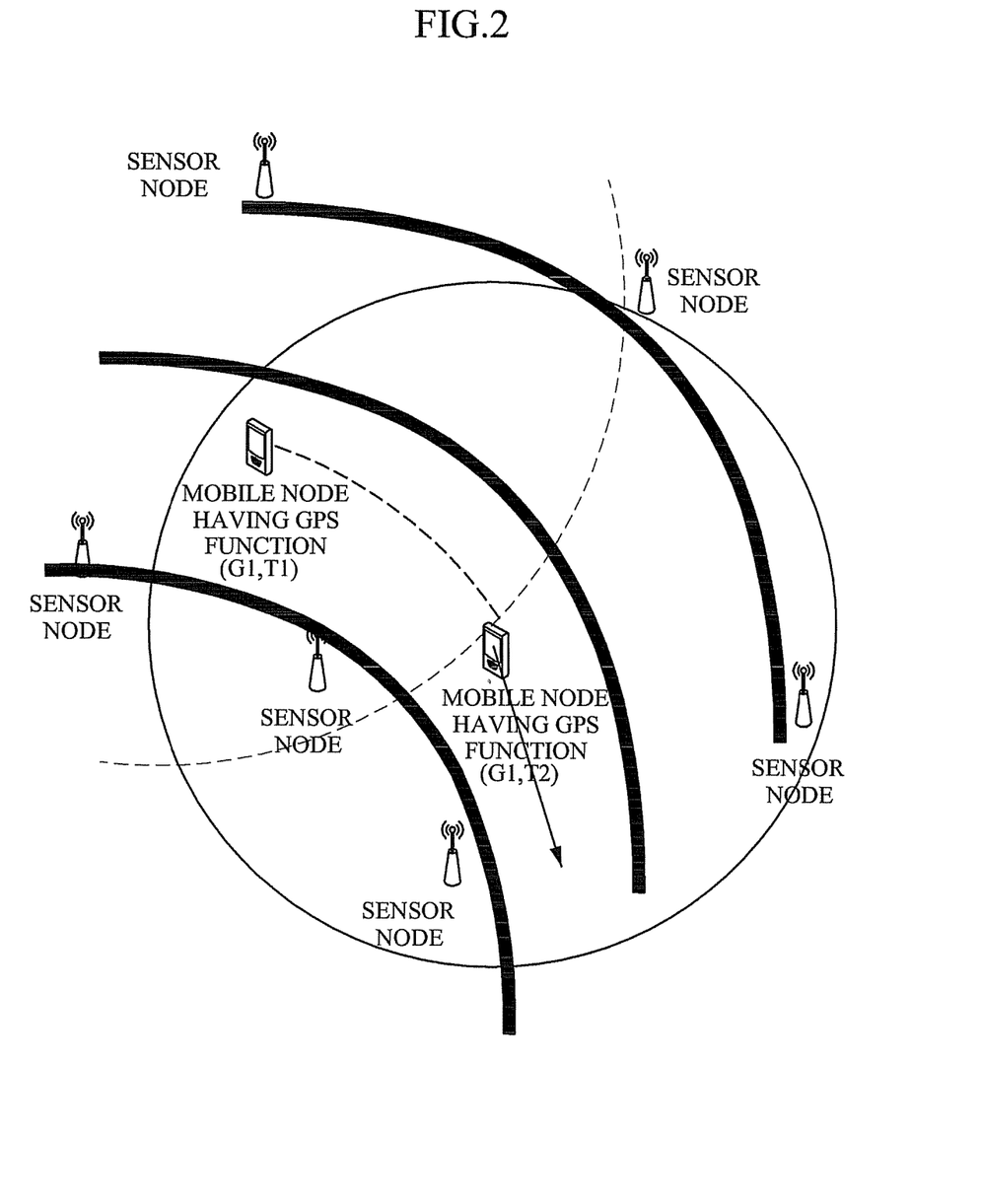
FIG. 2 is a view illustrating an exemplary mobile node being moved on a road on which sensor nodes are installed.

FIG. 2 is a view illustrating an exemplary mobile node being moved on a road on which sensor nodes are installed. If a mobile node having identification information G1 and a GPS function moves on a road having at least two lanes, a location of the mobile node is periodically is updated due to the GPS function.

The mobile node transmits identification information G1 and location information to the sensor network at a predetermined period. A sensor node stores locations (x1, y1) and (x2, y2) which are respectively received from the mobile node at a time T1 and a time T2.

Figure 3:
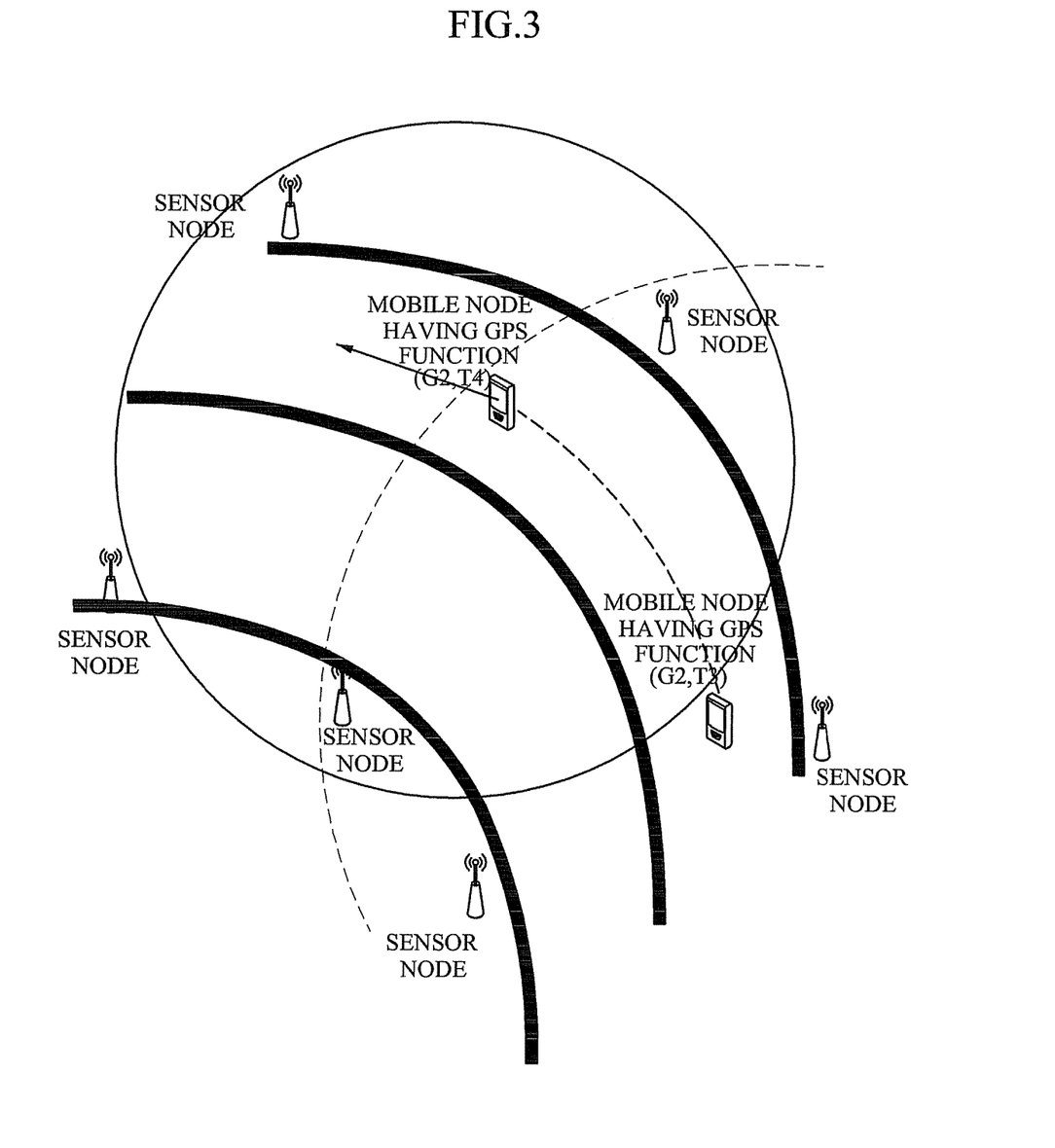
FIG. 3 is a view illustrating another exemplary mobile node being moved on a road on which sensor nodes are installed.

FIG. 3 is a view illustrating another exemplary mobile node being moved on a road on which sensor nodes are installed. If a mobile node having identification information G2 and a GPS function moves on a road having at least two lanes in a direction different from that of the mobile node shown in FIG. 2, a location of the mobile node having identification information G2 is periodically updated due to the GPS function.

The mobile node having the identification information G2 transmits identification information G2 and location information to the sensor network at a predetermined period. The sensor node stores locations (x3, y3) and (x4, y4) which are respectively received from the mobile node having the identification information G2 at a time T3 and a time T4.

Figure 4:
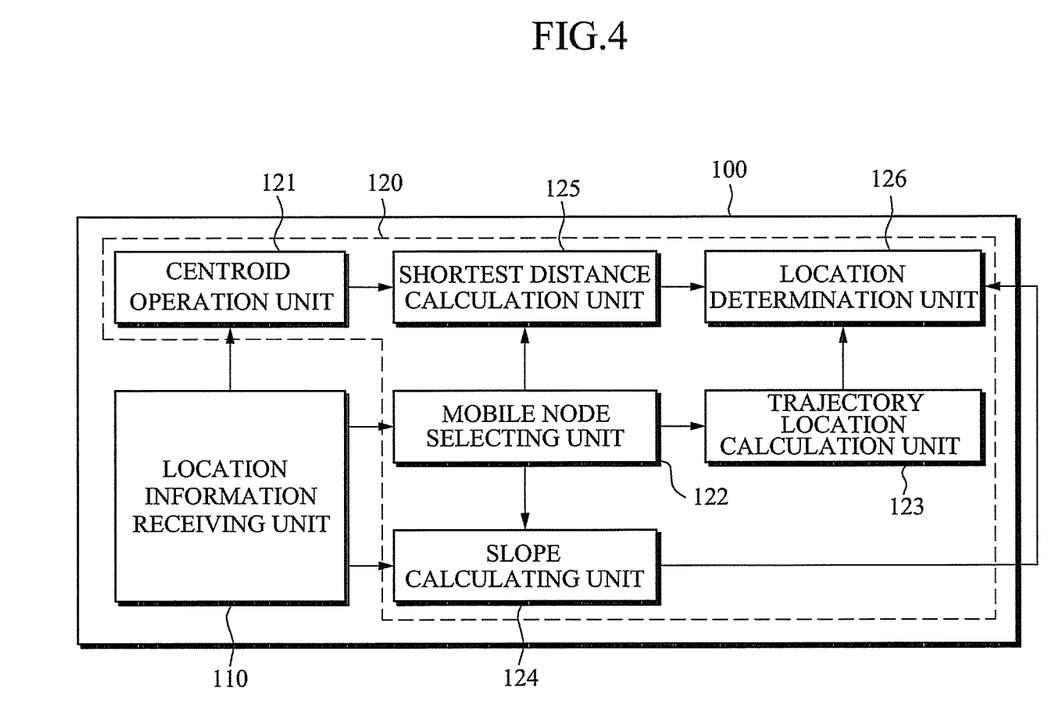
FIG. 4 is a block diagram showing an exemplary sensor node having a self localization function.

FIG. 4 is a block diagram showing an exemplary sensor node having a self localization function. As shown in FIG. 4, the sensor node 100 having a self localization function includes a location information receiving unit 110 and a self localization unit 120.

The location information receiving unit 110 receives location information measured at each of two mobile nodes at different times. The location information includes mobile node identification information for identifying a mobile node and coordinate information representing coordinates of a mobile node.

Figure 5:
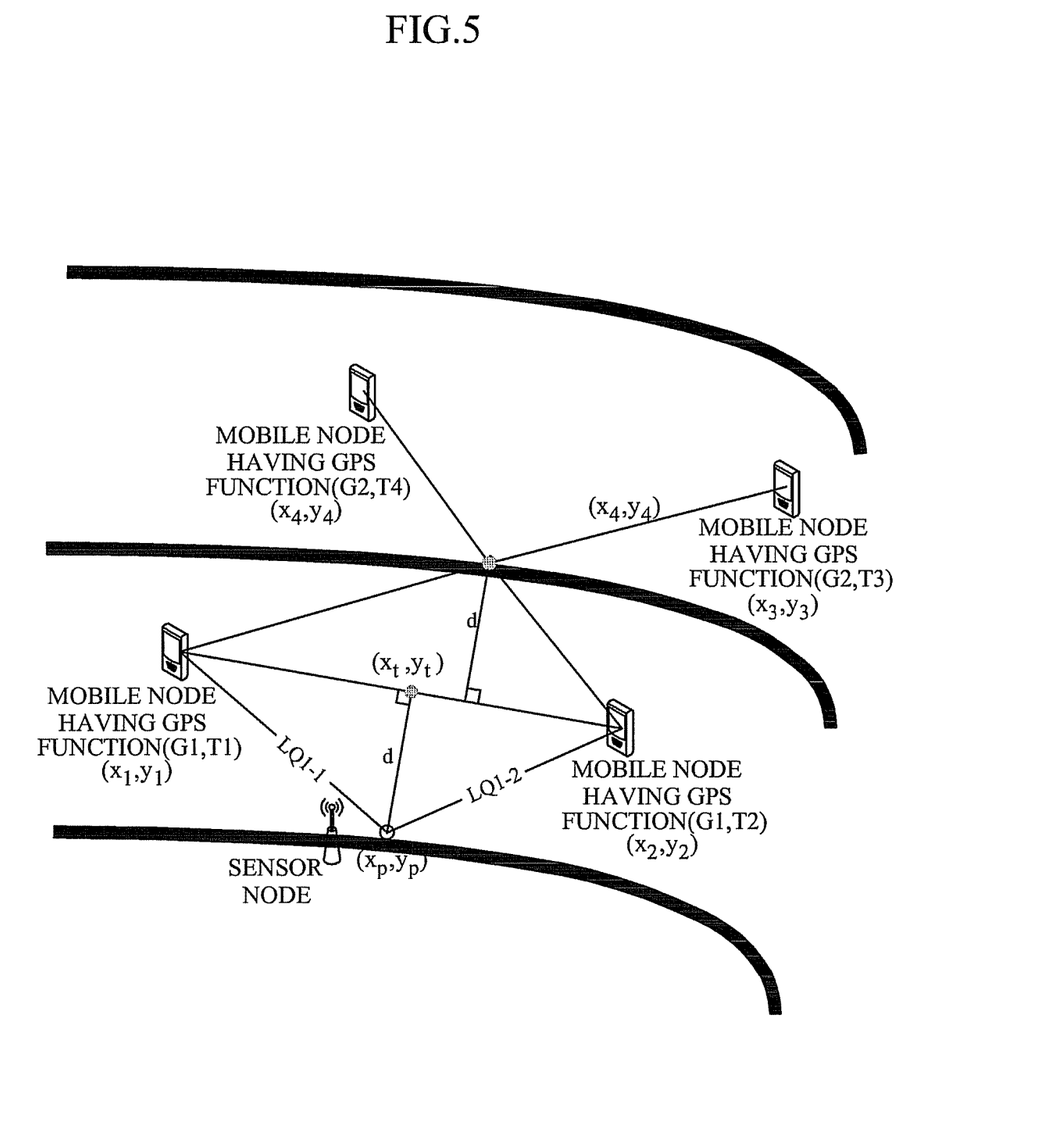
FIG. 5 is a view showing an exemplary sensor node being calculating a self localization function.

FIG. 5 is a view showing an exemplary sensor node being calculating its own location. As shown in FIG. 5, the sensor node 100 stores the locations (x1, y1) and (x2, y2) that are respectively received from the mobile node having the identification information G1 at a time T1 and a time T2 through the location information receiving unit 110. In addition, the sensor node 100 stores the locations (x3, y3) and (x4, y4) that are respectively received from the mobile node having the identification information G2 at a time T3 and a time T4 through the location information receiving unit 110.

The self localization unit 120 calculates the location of the sensor node 100 by using four location information received from the two mobile nodes. In detail, the location calculating unit 120 calculates the location of the sensor node 100 by using a center of gravity of a virtual square formed based on four locations included in the location information received from the two mobile nodes and each link quality indicator (LQI) of packets transmitted from the two mobile nodes.

In detail, the location calculating unit 120 includes a centroid operation unit 121, a mobile node selecting unit 122, a trajectory location calculation unit 123, a slope calculating unit 124, a shortest distance calculation unit 125 and a location determination unit 126.

The centroide operation unit 121 calculates a center of gravity (xg, yg) of a virtual square formed based on the four locations (x1, y1), (x2, y2) (x3, y3) and (x4, y4) included in the location information received from the two mobile nodes. The center of gravity (xg, yg) is obtained through the following equation.

$$(xg, yg) = \left( \frac{x1 + x2 + x3 + x4}{4}, \frac{y1 + y2 + y3 + y4}{4} \right)$$

The mobile node selection unit 122 selects a mobile node closer to the sensor node by using a link quality indicator (LQI) of the packets transmitted from the two mobile nodes. The mobile node selection unit 122 selects a mobile node having a higher LQI as the mobile node closer to the sensor node.

That is, the LQI is an indicator representing the quality of received packets. A higher LQI represents better quality, and the packet having better quality represents that the packet is transmitted from a closer location. In this regard, the mobile node selection unit 122 selects a mobile node having a higher LQI as the mobile node closer to the sensor node.

The trajectory location calculating unit 123 calculates a predetermined point (xt, yt) on a virtual line connecting two locations, which are included in the location information transmitted from the selected mobile node, by using a link quality indicator (LQI) of the selected mobile node.

For example, if the mobile node selection node 122 selects the mobile node having the identification information G1, the LQI of the location information (x1, y1) packet of the mobile node at the time T1 is LQI1, and the LQI of the location information (x2, y2) packet of the mobile node at the time T2 is LQI2, the predetermined point (xt, yt) on the virtual line is obtained through the following equation.

$$(xt, yt) = \left( \frac{LQI2 \cdot x1 + LQI1 \cdot x2}{LQI1 + LQI2}, \frac{LQI2 \cdot y1 + LQI1 \cdot y2}{LQI1 + LQI2} \right)$$

The slope calculating unit 124 calculates a slope of the virtual line connecting the two locations (x1, y1) and (x2, y2), which are included in the location information transmitted from the selected mobile. In this case, the slope of the virtual line connecting the two locations (x1, y1) and (x2, y2) is obtained through the following equation.

$$a = \left( \frac{y1 - y2}{x1 - x2} \right)$$

The shortest distance calculating unit 125 calculates a shortest distance d between the virtual line and the center of gravity.

In this case, the shortest distance d is obtained through the following equation.

$$d = \frac{|(y1 - y2) \cdot xg + (x2 - y1) \cdot yg + (x1 - x2) \cdot yg + (y2 - y1) \cdot xg|}{\sqrt{(x1 - x2)^2 + (y1 - y2)^2}}$$

The location determination unit 126 selects, as the location of the sensor node 100, a location which has been translated from the predetermined point (xt, yt) in perpendicular to the virtual line by the shortest distance d.

In this case, if the center of gravity of four locations of the mobile nodes deviates from the median lane of the road, a localization error of the sensor node is caused. Accordingly, such a localization error can be reduced by allowing the two mobile nodes to move symmetrically with respect to the median strip of the road.

$$xp = \frac{xt\left(a^2 + 1 \pm \sqrt{xt^2 \cdot (a^2 + 1)^2 - (a^2 + 1) \cdot (xt^2 \cdot (a^2 + 1) - d)}\right)}{a^2 + 1}$$

$$yp = -a(xp - xt) + yt$$

Meanwhile, two values are obtained through the above equation. The location of the sensor node 100 is obtained as a value corresponding to a location which is further distant from the center of gravity (xg, yg) from two locations that are translated by the shortest distance from the predetermined point (xt, yt) in perpendicular to the virtual line.

As described above, all sensor nodes in a sensor network can recognize their own location by using a location variation caused by a movement of two mobile nodes without using an anchor node, and thus reduces additional cost and power consumption required for additional equipment such as an anchor node, a ultrasonic transceiver and a signal amplifier.

Figure 6:
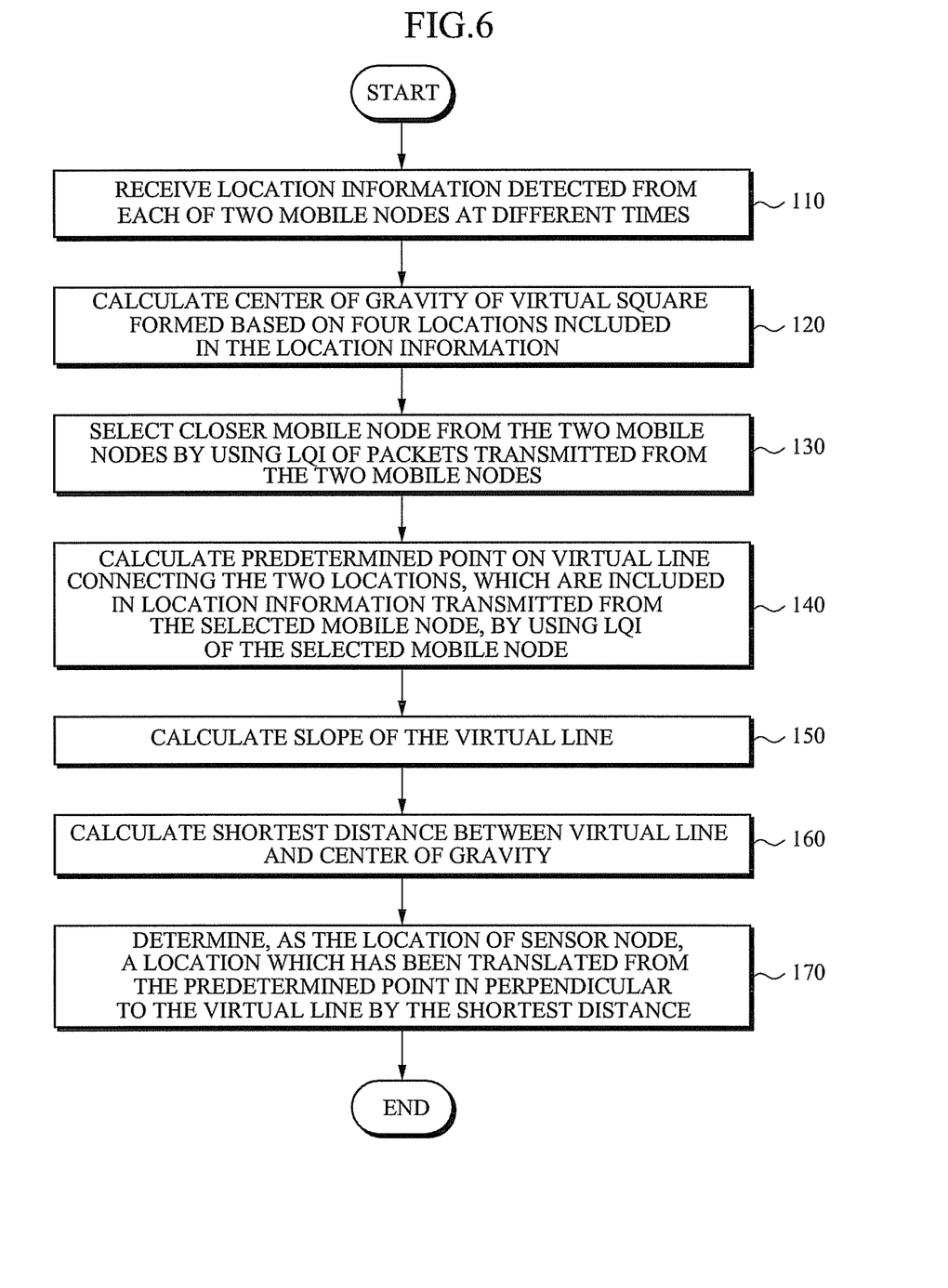
FIG. 6 is a flowchart showing an exemplary self localization method of the sensor node.

Referring to FIG. 6, a self localization operation of a sensor node will be described. FIG. 6 is a flowchart showing a self localization method of a sensor node having a self localization function.

First, the sensor node receives location information measured at each of two mobile nodes at different times (operation 110). The location information includes mobile node identification information for identifying the mobile node and coordinate information for representing coordinates of the mobile node.

After that, a center of gravity of a virtual square formed based on four locations included in the location information is calculated (operation 120). Since the equation of calculating the center of gravity has been described above, the details of the description will be omitted to avoid redundancy.

Then, a mobile node closer to the sensor node is selected from the two mobile nodes by using a link quality indicator (LQI) of packets transmitted from the two mobile nodes (operation 130). The selecting of the mobile node closer to the sensor node is performed by selecting a mobile node having a higher LQI.

That is, the LQI is an indicator representing the quality of packets received from the mobile nodes. A higher LQI represents better quality, and the packet having better quality represents that the packet is transmitted from a closer location. In this regard, the mobile node selection unit selects a mobile node having a higher LQI as the mobile node closer to the sensor node.

After that, a predetermined point placed on a virtual line connecting two locations, which are included in location information transmitted from the selected mobile node, is calculated by using a link quality indicator (LQI) of the selected mobile node (operation 140). Since the is equation for calculating the predetermined point has been described above, the details of the description will be omitted to avoid redundancy.

Then, a slope of the virtual line is calculated (operation 150). Since the equation for calculating the slope has been described above, the details of the description will be omitted to avoid redundancy.

After that, a shortest distance between the virtual line and the center of gravity is calculated (operation 160). Since the equation for calculating the shortest distance between the virtual line and the center of gravity has been described above, the details of the description will be omitted to avoid redundancy.

Then, a location of the sensor node is determined. The location of the sensor node is a location which has been translated from the predetermined point in perpendicular to the virtual line by the shortest distance (operation 170).

In the selecting of the location (operation 170), the location of the sensor node corresponds to a location which is further distant from the center of gravity from two locations that are translated by the shortest distance from the predetermined point in perpendicular to the virtual line. Since the equation of determining the location of the sensor node has been described above, the details of the description will be omitted to avoid redundancy.

Accordingly, all sensor nodes in a sensor network can recognize their own location by using location variation caused by a movement of two mobile nodes without using an anchor node, and this can thus reduce additional costs and power consumed by additional equipment such as an anchor node, a ultrasonic transceiver and a signal amplifier.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A sensor node having a self localization function, the sensor node comprising:

a location information receiving unit to receive information about locations measured at each of two mobile nodes at different times; and a self localization unit to calculate a location of the sensor node by using four location information of the information received from the two mobile nodes, wherein the location calculating unit calculates the location of the sensor node by using a center of gravity of a virtual square formed based on four locations included in the location information received from the two mobile nodes and link quality indicators (LQIs) of packets transmitted from the two mobile nodes, wherein the location calculating unit comprises:

a centroid operation unit to calculate the center of gravity of the virtual square formed based on the four locations included in the location information received from the two mobile nodes;

a mobile node selecting unit to select a mobile node closer to the sensor node by using the LQIs of the packets transmitted from the two mobile nodes;

a trajectory location calculating unit to calculate a predetermined point on a virtual line connecting two locations, which are included in location information transmitted from the selected mobile node, by using a LQI of the selected mobile node;

a slope calculating unit to calculate a slope of the virtual line connecting the two locations;

a shortest distance calculating unit to calculate a shortest distance between the virtual line and the center of gravity; and a location determination unit to select, as the location of the sensor node, a location which has been translated from the predetermined point in perpendicular to the virtual line by the shortest distance.

2. The sensor node of claim 1, wherein the mobile node selecting unit selects a mobile node having a higher LQI as the mobile node closer to the sensor node.

3. The sensor node of claim 1, wherein the location determination unit determines, as the location of the sensor node, a location which is further distant from the center of gravity from two locations that are translated by the shortest distance from the predetermined point in perpendicular to the virtual line.

4. The sensor node of claim 1, wherein the location information received from the location information receiving unit includes mobile node identification information for identifying the mobile node and coordinate information for representing coordinates of the mobile node.

5. A self localization method of a sensor node, the method comprising:

receiving location information measured at each of two mobile nodes at different times;

calculating a center of gravity of a virtual square formed based on four locations included in the location information;

selecting a mobile node closer to the sensor node from the two mobile nodes by using a link quality indicator (LQI) of packets transmitted from the two mobile nodes;

calculating a predetermined point of a virtual line connecting two locations, which are included in location information transmitted from the selected mobile node, by using a link quality indicator (LQI) of the selected mobile node;

calculating a slope of the virtual line; calculating a shortest distance between the virtual line and the center of gravity; determining, as a location of the sensor node, a location which is separated by the shortest distance from the predetermined point; and selecting, as the location of the sensor node, a location which has been translated from the predetermined point in perpendicular to the virtual line by the shortest distance.

6. The method of claim 5, wherein the selecting of the mobile node closer to the sensor node is performed by selecting a mobile node having a higher LQI.

7. The method of claim 5, wherein, in the selecting of the location, the location of the sensor node is selected as a location which is further distant from the center of gravity from two locations that are translated by the shortest distance from the predetermined point in perpendicular to the virtual line.

8. The method of claim 5, wherein the location information includes mobile node identification information for identifying the mobile node and coordinate information for representing coordinates of the mobile node.

* * * * *